(12) United States Patent
Jaini (10) Patent No.: US 10,567,845 B2
(45) Date of Patent: *Feb. 18, 2020

(54) EMBEDDABLE MEDIA CONTENT SEARCH WIDGET

(71) Applicant: Google LLC, Mountain View, CA (US)

(72) Inventor: Shiva Jaini, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,271

(22) Filed: Oct. 30, 2017

(65) Prior Publication Data

US 2018/0054652 A1 Feb. 22, 2018

Related U.S. Application Data

(63) Continuation-in-part of application No. 13/916,290, filed on Jun. 12, 2013, now Pat. No. 9,805,406.

(51) Int. Cl.
*H04N 21/414* (2011.01)
*H04N 21/482* (2011.01)
(Continued)

(52) U.S. Cl.
CPC ......... *H04N 21/482* (2013.01); *G06F 3/0482* (2013.01); *G06F 16/738* (2019.01);
(Continued)

(58) Field of Classification Search
CPC combination set(s) only.
See application file for complete search history.

(56) References Cited

U.S. PATENT DOCUMENTS 8,145,521 B2 3/2012 Sah
8,260,687 B2 9/2012 Chang et al.
(Continued)

FOREIGN PATENT DOCUMENTS

JP 2008-040788 A 2/2008
JP 2010-066870 3/2010
(Continued)

OTHER PUBLICATIONS

Extended European Search Report for Application No. 1411543.9 dated Dec. 15, 2016, 7 pages.
(Continued)

*Primary Examiner* — Hien L Duong
(74) *Attorney, Agent, or Firm* — Lowenstein Sandler LLP (57) ABSTRACT

A method includes receiving, at a first computer system of a first content platform, application code from a second computer system of a second content platform, embedding the application code in a user interface presenting content associated with the first content platform, and providing the user interface to a mobile device. The application code in the user interface causes the mobile device to present, in the user interface, the content associated with the first content platform and a playlist. The playlist represents an ordered set of videos to be played sequentially. The ordered set of videos includes a first and second video that are selected from videos based on the content. In response to a user selecting a representation of the first video in the playlist, a playback of the first video is provided in the user interface, together with a presentation of the content.

20 Claims, 7 Drawing Sheets

(51) Int. Cl.
*G06F 3/0482* (2013.01)
*G06F 17/22* (2006.01)
*G06F 16/738* (2019.01)
*G06F 16/74* (2019.01)
*G06F 16/78* (2019.01)
*H04N 21/45* (2011.01)

(52) U.S. Cl.
CPC ........ *G06F 16/743* (2019.01); *G06F 16/7867* (2019.01); *G06F 17/2235* (2013.01); *H04N 21/41407* (2013.01); *H04N 21/4508* (2013.01)

(56) References Cited

U.S. PATENT DOCUMENTS

| | | | |
|---|---|---|---|
| 9,204,205 B1* | 12/2015 | Pasula | H04N 21/812 |
| 2001/0042107 A1 | 11/2001 | Palm | |
| 2008/0097871 A1 | 4/2008 | Williams et al. | |
| 2008/0154889 A1* | 6/2008 | Pfeiffer | G06F 16/738 |
| 2008/0255962 A1 | 10/2008 | Chang et al. | |
| 2008/0319839 A1* | 12/2008 | Olliphant | G06Q 30/02 |
| | | | 705/14.54 |
| 2009/0024927 A1* | 1/2009 | Schrock | G06Q 30/02 |
| | | | 715/722 |
| 2009/0099901 A1 | 4/2009 | Sah et al. | |
| 2009/0259927 A1* | 10/2009 | Fisher | G06F 17/30864 |
| | | | 715/205 |
| 2010/0017289 A1* | 1/2010 | Sah | G06Q 30/02 |
| | | | 705/14.49 |
| 2010/0070862 A1* | 3/2010 | Partovi | G06F 16/4387 |
| | | | 715/716 |
| 2010/0076991 A1 | 3/2010 | Nakano et al. | |
| 2010/0114722 A1* | 5/2010 | Ueshima | G06Q 30/02 |
| | | | 705/14.73 |
| 2011/0035729 A1 | 2/2011 | Sakhare et al. | |
| 2011/0161181 A1* | 6/2011 | Esteve Asensio | G06Q 30/02 |
| | | | 705/14.73 |
| 2011/0213655 A1* | 9/2011 | Henkin | G06Q 30/00 |
| | | | 705/14.49 |
| 2011/0231265 A1* | 9/2011 | Brown | G06Q 30/02 |
| | | | 705/14.73 |
| 2011/0320429 A1* | 12/2011 | Doig | G06F 16/9535 |
| | | | 707/711 |
| 2013/0036191 A1 | 2/2013 | Fink et al. | |
| 2013/0066719 A1* | 3/2013 | Kast | G06Q 30/02 |
| | | | 705/14.53 |
| 2013/0276021 A1* | 10/2013 | Cho | H04N 21/80 |
| | | | 725/32 |
| 2013/0332262 A1* | 12/2013 | Hunt | G06Q 30/02 |
| | | | 705/14.43 |
| 2014/0074629 A1* | 3/2014 | Rathod | G06Q 10/10 |
| | | | 705/14.73 |
| 2014/0129942 A1* | 5/2014 | Rathod | H04N 21/44222 |
| | | | 715/720 |
| 2014/0143043 A1* | 5/2014 | Wickramasuriya | H04N 21/41407 |
| | | | 705/14.45 |
| 2014/0298184 A1 | 10/2014 | Bailin | |
| 2014/0316913 A1* | 10/2014 | He | H04L 67/2804 |
| | | | 705/14.73 |
| 2015/0154650 A1* | 6/2015 | Umeda | G06Q 30/0273 |
| | | | 705/14.68 |
| 2017/0052953 A1* | 2/2017 | Imbruce | G06F 17/30014 |
| 2017/0053029 A1* | 2/2017 | Imbruce | G06F 17/30864 |

FOREIGN PATENT DOCUMENTS

| | | |
|---|---|---|
| JP | 2011-508925 | 3/2011 |
| WO | 2009086014 A1 | 7/2009 |

OTHER PUBLICATIONS

International Searching Authority, "Notification of Transmittal of the International Search Report and the Written Opinion of the International Search Authority, or the Declaration," for International Application No. PCT/US2014/039242, dated Sep. 24, 2014, 3 pages.

Evans, Woody: "Searching the widgetized web," Searcher Jan. 2009 v17i1, ProQuest Dialog #1914771 01 6pgs.

Business Wire: "#waywire Brings the Power of Context to Video for the First Time, " Apr. 16, 2013, ProQuest #1327098091, 6pgs.

\* cited by examiner

EMBEDDABLE MEDIA CONTENT SEARCH WIDGET

CROSS-REFERENCE TO RELATED APPLICATION

This continuation application claims priority to U.S. patent application Ser. No. 13/916,290, filed on Jun. 12, 2013, which is incorporated by reference in its entirety.

TECHNICAL FIELD

Aspects and implementations of the present disclosure relate to data processing systems, and more specifically, to a software component that can be embedded in user interfaces.

BACKGROUND

Users are increasingly researching products and services online prior to making a purchase. Such research may include consulting demonstration videos, text-based reviews, audio-based reviews, video-based reviews, retailer websites, shopping search engines, and so forth.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a first computer system that is associated with a first organization provides a software component to a second computer system that is associated with a second organization, where the software component, when embedded and executed within a user interface provided by the second organization, includes in the user interface a first link to a first media content item and a second link to a second media content item. In one implementation, the first media content item and the second media content item reside in a data store associated with the first organization, and the first media content item and the second media content item are selected from a plurality of media content items based on content in the user interface.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

When a user is contemplating purchasing a product or service (e.g., while browsing a retailer's website, while using an application [or "app"] created by the provider of the product or service, etc.), the user often visits other websites or switches among apps in order to research the product or service. Conducting research in this manner is particularly inconvenient on mobile devices (e.g., smartphones, etc.) because such devices typically have small screens and can only display a single website or app on the screen at a time. This inconvenience can discourage users of mobile devices from making purchases, and can result in lost sales of "impulse" and other types of purchases. For example, if a user is viewing a product listings page via a mobile web page or application to shop for an item, and the user wishes to check whether a video demonstration of the item exists, he or she might:

open another web page (or launch another application) to input the item's name into a search engine (e.g., by typing, by copy/pasting, etc.) and filter the search results for videos; or launch another application (e.g., an application for searching and viewing videos in a repository) to search for such a video demonstration.

In either case, the user must switch between web pages or applications to find the video demonstration, an inconvenient proposition on a mobile device that may result in the user abandoning the research and purchase.

Aspects and implementations are disclosed by which a first computer system that is associated with a first organization provides a software component (known as a "widget") to a second computer system that is associated with a second organization, where the software component, when embedded and executed within a user interface provided by the second organization, includes in the user interface links to relevant media content items (e.g., video clips, audio clips, etc.) in a data store (e.g., a file server, a relational database, etc.) managed by the first organization. In some implementations, the software component may be embedded within a user interface of an application (or "app") that is created by the second organization and is downloaded and run by a client (e.g., a smartphone, a laptop computer, etc.), while in some other implementations, the software component may be embedded within a web page that is created by the second organization and is downloaded by a client browser.

Aspects and implementations of the present disclosure are thus capable of enabling a user who is browsing a retailer's mobile website, for example, on his or her smartphone, or who is using a retailer's mobile app running on the smartphone, to research a potential purchase without having to leave the current web page or suspend the current app. More particularly, a website developer who works for the retailer (i.e., the "second organization" referenced above) can obtain a software component from another organization (i.e., the "first organization" referenced above) and embed the software component in a user interface that is downloaded and run by a client (e.g., in a web page visited by a client browser, in an app downloaded and run by a client, etc.). In one implementation, the software component obtains one or more keywords based on content of the user interface (e.g., text, button labels, images, metadata tags, etc.) and transmits a query to the data store of the first organization, where the query specifies the keyword(s) and requests links to media content items in the data store that are relevant to the keyword(s). In response to the query, relevant media content items are selected from among the items stored in the data store based on the specified keyword(s) and links to the selected media content items are transmitted to the software component. The software component creates a playlist in the user interface, and then populates the playlist with the received links. As a result, a playlist of relevant videos (e.g., a product demonstration video, etc.) is available for the user to view in the current web page or application, without having to leave the web page or application and visit a new web page or launch another application, thereby improving the user experience.

Figure 1:
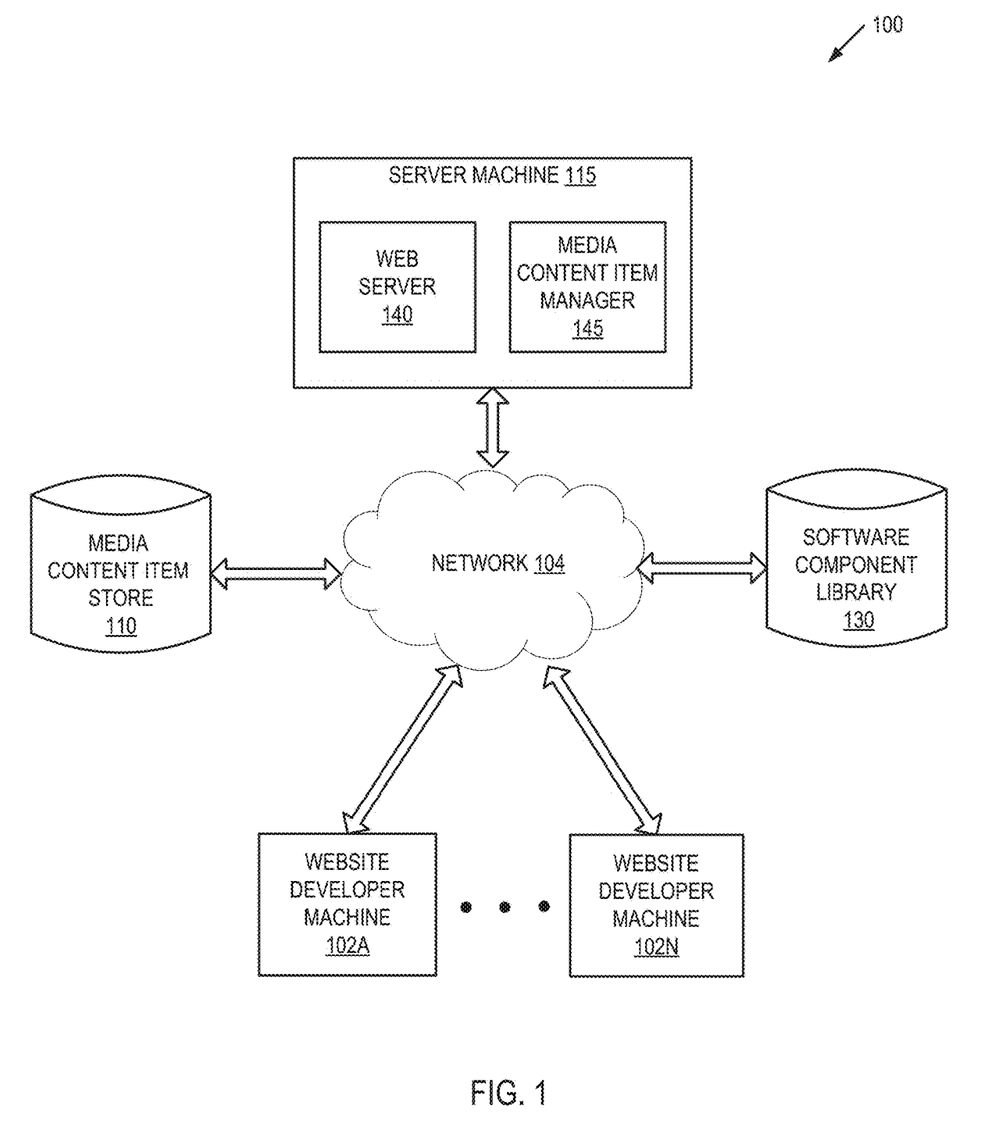
FIG. 1 illustrates an exemplary system architecture, in accordance with one implementation of the present disclosure.

FIG. 1 illustrates an exemplary system architecture 100, in accordance with one implementation of the present disclosure. The system architecture 100 includes a server machine 115, a media content item store 110, a software component library 130, and website developer machines 102A-102N connected to a network 104. Network 104 may be a public network (e.g., the Internet), a private network (e.g., a local area network (LAN) or wide area network (WAN)), or a combination thereof.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a web server 140 and a media content item manager 145. In alternative implementations, the web server 140 and media content item manager 145 may run on different machines (e.g., a plurality of servers that are part of a content hosting and sharing platform, etc.).

Media content item store 110 is a persistent storage that is capable of storing media content items (e.g., video clips, audio clips, images, etc.), as well as data structures to tag, organize, and index the media content items, and of processing queries pertaining to the stored media content items. Media content item store 110 may be hosted by one or more storage devices, such as main memory, magnetic or optical storage based disks, tapes or hard drives, NAS, SAN, and so forth. In some implementations, media content item store 110 may be a network-attached file server, while in other embodiments media content item store 110 may be some other type of persistent storage such as an object-oriented database, a relational database, and so forth, that may be hosted by the server machine 115 or one or more different machines coupled to the server machine 115 via the network 104. The media content items stored in the media content item store 110 may include end user content that is uploaded via user devices, as well as media content items uploaded by publishers, libraries, news services, and so forth. In one implementation, media content item store 110 is maintained by the same organization (e.g., corporation, government agency, etc.) that maintains server machine 115.

Software component library 130 is a persistent storage that is capable of storing software components (e.g., widgets that can be embedded in web pages, widgets that can embedded in user interfaces of applications, software objects [e.g., data structures, business objects, etc.] that can be used by applications written in an object-oriented programming language, etc.), as well as data structures to tag, organize, and index the software components. The software components may be provided by private software organizations, open-source software organizations, independent software developers, and so forth.

Software component library 130 may be hosted by one or more storage devices, such as main memory, magnetic or optical storage based disks, tapes or hard drives, NAS, SAN, and so forth. In some implementations, software component library 130 may be a network-attached file server, while in other embodiments software component library 130 may be some other type of persistent storage such as an object-oriented database, a relational database, and so forth, that may be hosted by the server machine 115 or one or more different machines coupled to the server machine 115 via the network 104. In one implementation, software component library 130 is maintained by the same organization (e.g., corporation, government agency, etc.) that maintains server machine 115 and media content item store 110.

In accordance with some implementations, media content item manager 145 is capable of receiving requests (e.g., from software components, etc.) for links to items stored in media content item store 110, and of providing such links in response to the requests. In one implementation, media content item manager 145 may select particular items in media content item store 110 based on one or more keywords specified by a request, and return links to these relevant content items to the sender of the request. In some aspects, media content item manager 145 may also be capable of providing software components (e.g., from software component library 130, etc.) to developers (e.g., via web server 140, etc.). Some operations of media content item manager 145 are described in detail below with respect to FIG. 2 and FIG. 6.

In one example, server machine 115, media content item store 110, and software component library 130 are associated with one particular organization (e.g., an organization that provides a content hosting and/or sharing platform).

The website developer machines 102A-102N are personal computers (PC), laptops, tablet computers, smartphones, or any other computing or communication devices. In one example, each website developer machine 102 is associated with a human website developer who belongs to an organization that is different than the organization associated with server machine 115, media content item store 110, and software component library 130.

The website developer machines 102A-102N may run an operating system (OS) that manages hardware and software of the website developer machines 102A-102N. A browser (not shown) may run on the website developer machines (e.g., on the OS of the website developer machines). The browser may be a web browser that can download and render web pages served by a web server (e.g., web server 140 hosted by server machine 115, etc.) and download items (e.g., images, software components [or "widgets"], etc.) embedded within or linked to by the web pages.

Figure 2:
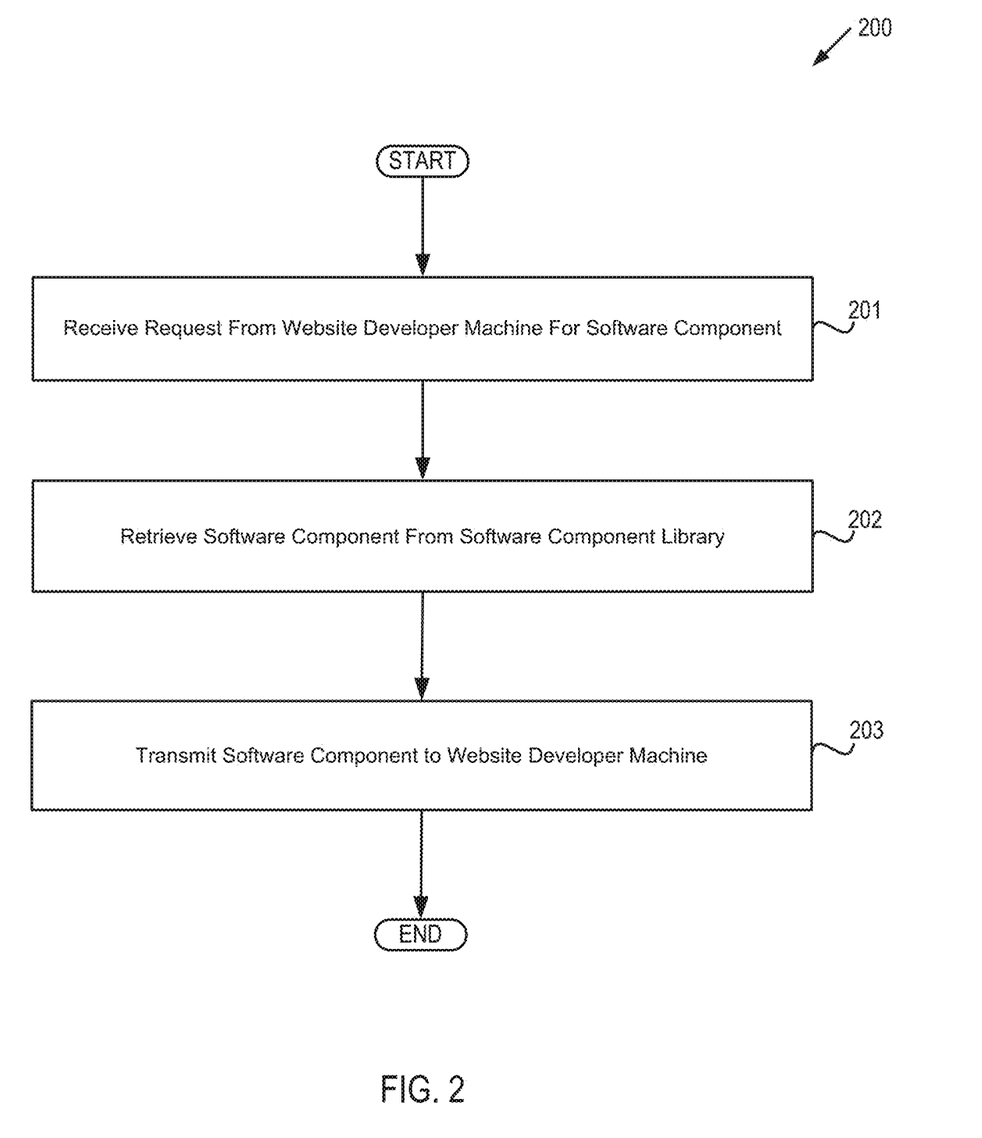
FIG. 2 depicts a flow diagram of an example of a method for handling a request for a software component.

FIG. 2 depicts a flow diagram of an example of a method 200 for handling a request for a software component. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG.

1, while in some other implementations, one or more blocks of FIG. 2 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 201, a request is received for a software component. In one implementation, the request is received by web server 140 from a website developer machine and may be generated in response to a website developer clicking on a particular link, button, etc. of a web page downloaded from server machine 115. The website developer may arrive at the web page via a search engine query, or via a link in an email received by the website developer, etc.

At block 202, the requested software component is retrieved from software component library 130, and at block 203, the software component is transmitted to the website developer machine. In one implementation, web content item manager 145 retrieves the software component and transmits the software component to the website developer machine via the File Transfer Protocol (FTP). It should be noted that in some other implementations, the software component may be obtained by a website developer in some other manner, rather than via downloading from a website (e.g., from a CD-ROM distribution provided to the website developer, etc.).

Figure 3:
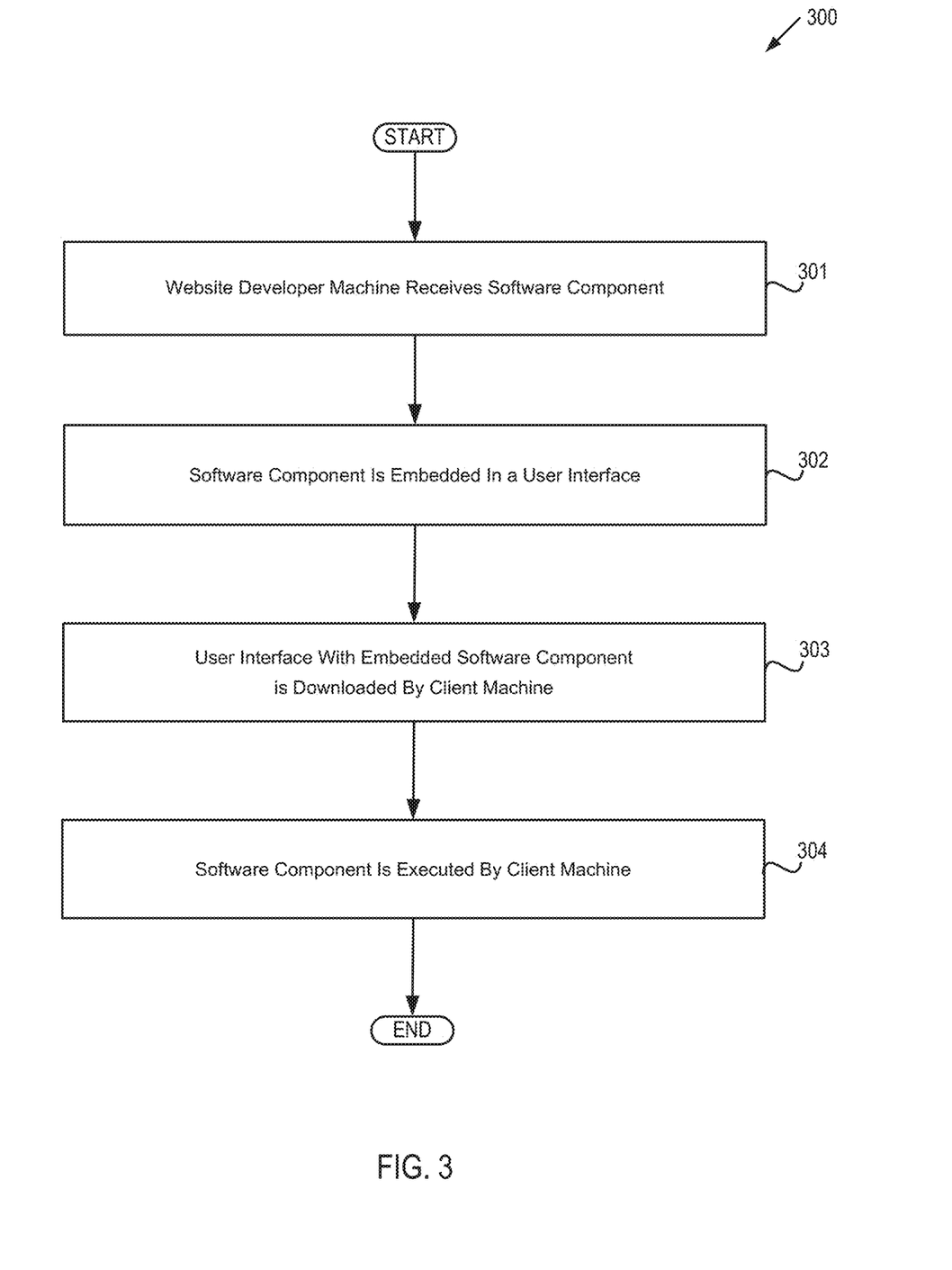
FIG. 3 depicts a flow diagram of an example of a method by which a software component is embedded in a user interface that is downloaded and executed by a client machine.

FIG. 3 depicts a flow diagram of an example of a method 300 by which a software component is embedded in a user interface that is downloaded and executed by a client machine. The method is performed by processing logic that may comprise hardware (circuitry, dedicated logic, etc.), software (such as is run on a general purpose computer system or a dedicated machine), or a combination of both.

At block 301, a website developer machine (e.g., one of machines 102A through 102N of FIG. 1, etc.) receives a software component. In one implementation, the website developer machine belongs to a particular organization and the software component is received from a different organization (e.g., from software component library 130, etc.).

At block 302, the software component is embedded in a user interface. In some implementations, the user interface may be a web page (e.g., a web page of an e-commerce company, a web page of a shopping search engine service, etc.), and the software component may be a Javascript widget, an ActiveX control, etc. that is embedded within the web page, while in some other implementations, the user interface may be part of an application that executes independent of a browser, and the software component may be a Javascript widget, a Java object, etc. that is embedded within the user interface (e.g., as source code, Java bytecode, object code, etc.).

At block 303, the user interface with embedded software component is downloaded by a client machine (e.g., via a smartphone whose user is browsing a web page [for example, a web page of an e-commerce company or of a shopping search engine service] via the World Wide Web, via a smartphone whose user has elected to download an application comprising the user interface [for example, a search engine application, an app provided by baseball team, an app provided by a retailer, etc.] from an "app store" or other site, etc.) At block 304, the software component is executed by the client machine. When the software component is embedded within a web page, the software component may be executed when the web page is rendered by a browser running on the client machine, while when the software component is embedded within a user interface (UI) of an application, the software component may be executed when the UI portion of the application code is run by the client machine.

Figure 4:
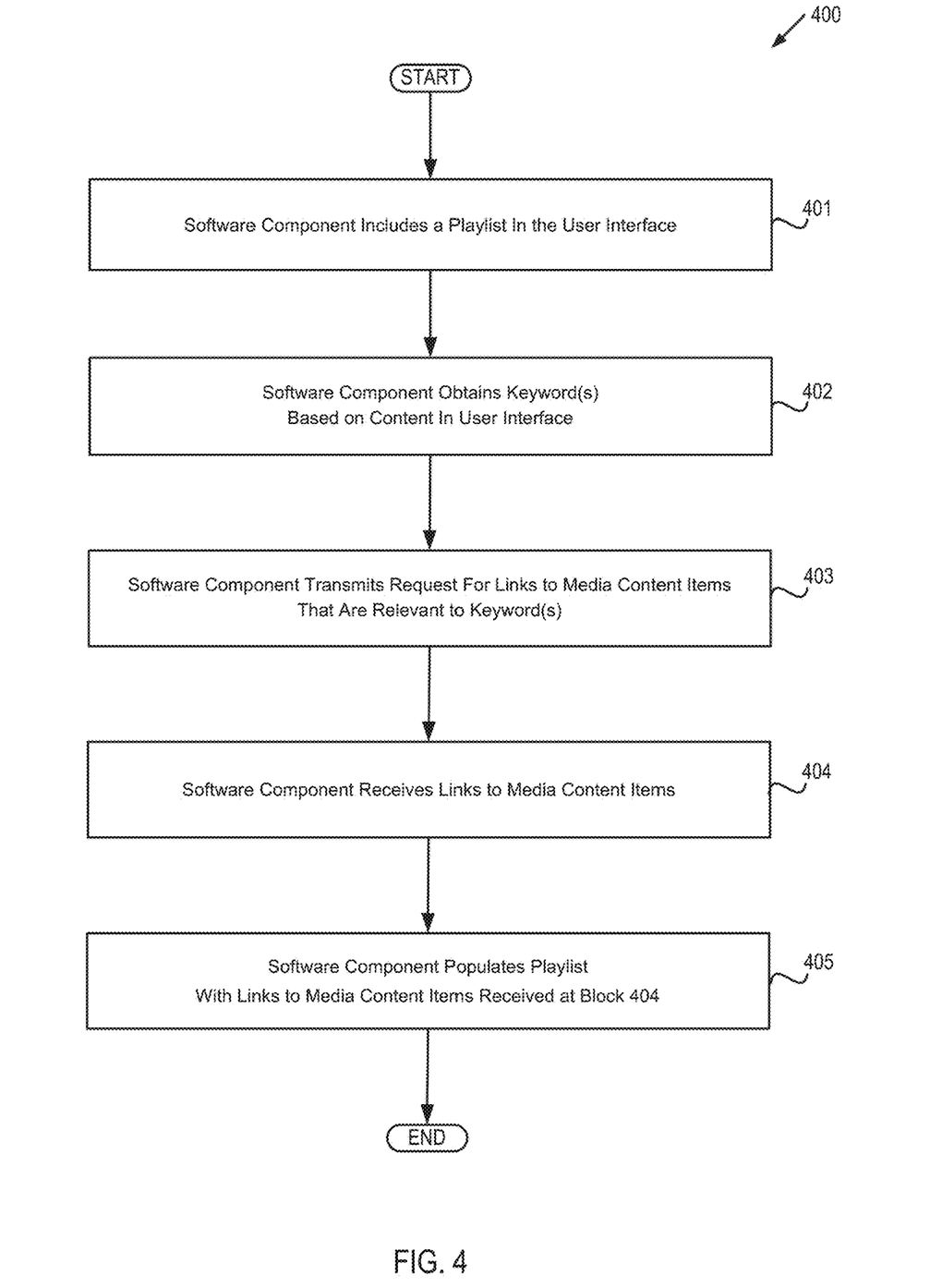
FIG. 4 depicts a flow diagram of an example of some operations of an embedded software component when executed by a client machine.

FIG. 4 depicts a flow diagram of an example of some operations 400 of an embedded software component when executed by a client machine. The operations are performed by processing logic that may comprise hardware (circuitry, dedicated logic, etc.), software (such as is run on a general purpose computer system or a dedicated machine), or a combination of both.

Figure 5:
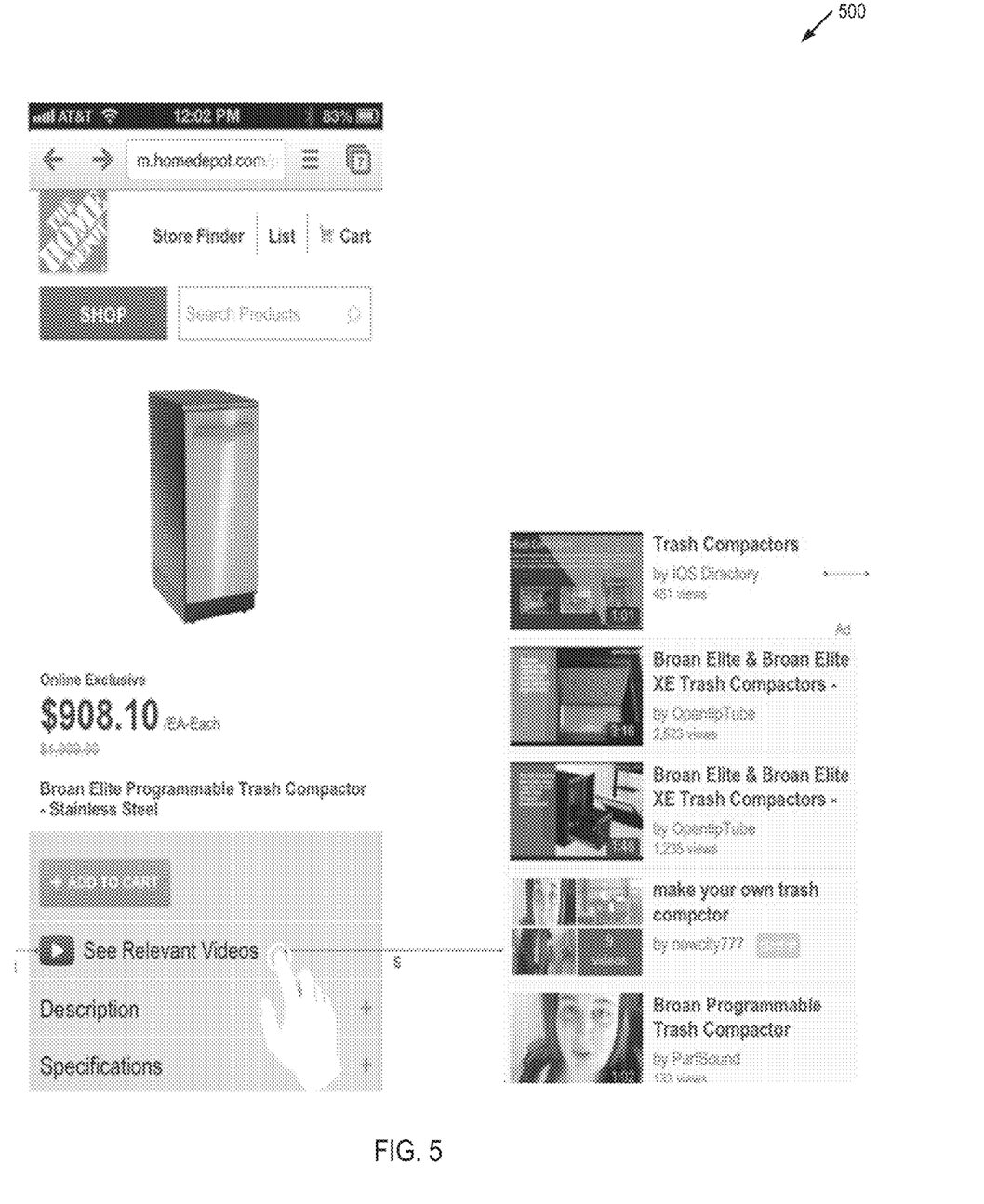
FIG. 5 depicts an illustrative user interface with embedded playlist, in accordance with one implementation of the present disclosure.

At block 401, the software component includes a playlist in the user interface (e.g., the illustrative user interface 500 with embedded playlist shown in FIG. 5, etc.). When the user interface is a web page, the software component may create a playlist widget and add the widget within the markup language code of the user interface so that it is displayed in a particular area of the web page. Alternatively, when the user interface is part of an application, the software component may instantiate a new playlist object and add the playlist object to the elements of the user interface. In one implementation, the playlist widget or object comprises a first area that presents a description of media content items (e.g., titles of the media content items and/or a thumbnail of a frame of a video clip item) and enables a user to select one of the media content items, and a second area in which a selected media content item is played. It should be noted that some other implementations may create a different type of widget or object, rather than a playlist (e.g., a widget or object in which media content items are described by an unordered set rather than an ordered list, etc.)

At block 402, the software component analyzes content in the user interface (e.g., text, button labels, metadata tags, etc.) and obtains one or more keywords based on the content. (It should be noted that the term "keyword" is used in this disclosure to include multi-word phrases (e.g., "Barack Obama," "San Francisco Giants," etc.) as well as single words.) For example, in illustrative user interface 500 of FIG. 5, the one or more keywords might include "Broan", "Trash Compactor", "Stainless Steel", and so forth. It should be noted that when the software component is an object in an object-oriented application, the software component may analyze content in the user interface at runtime via a self-reflection mechanism provided by the object-oriented programming language. At block 403, the software component transmits a request that specifies the keyword(s) obtained at block 402 and requests links to media content items relevant to the keyword(s). In some implementations, the request may also specify the current location of the client machine when allowed by the user (e.g., when the user responds affirmatively to a prompt from the operating system requesting permission for a website or application to use the current location, etc.). In accordance with one aspect, the request is transmitted to and handled by server machine 115. A method for handling the request is described in detail below with respect to FIG. 6.

At block 404, the software component receives links to media content items in response to the query transmitted at block 403. In some implementations, the links received at block 404 may be ranked, while in some other implementations, the links may be returned as an unordered set. In one aspect, the software component may rank or re-rank the links based on one or more criteria such as current location, relevancy scores, the authors of the media content items, and so forth.

In one embodiment, the links are received from server machine 115 and point to media content items in media content item store 110. At block 405, the software component populates the playlist included in the UI at block 401 with the links to media content items received at block 404. It should be noted that in some other embodiments, the software component may include a playlist in the user interface and populate the playlist at compile time (e.g., via modifying code or markup language before downloading and execution of the user interface, etc.), rather than dynamically at runtime, as in the method of FIG. 4.

Figure 6:
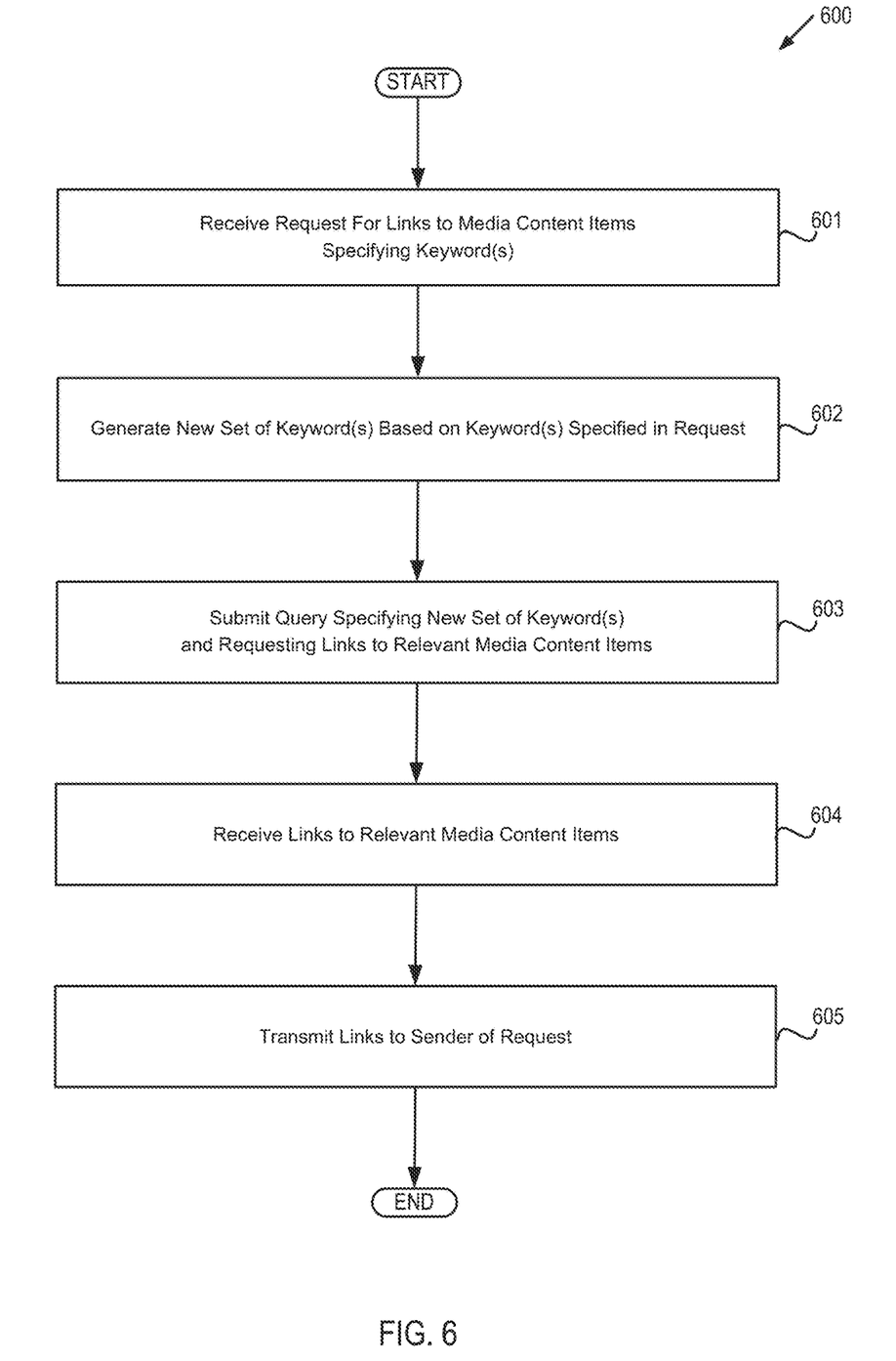
FIG. 6 depicts a flow diagram of an example of a method for processing a request for links to media content items that are relevant to one or more keywords.

FIG. 6 depicts a flow diagram of an example of a method 600 for processing a request for links to media content items that are relevant to one or more keywords. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more blocks of FIG. 6 may be performed by another machine.

At block 601, a request that specifies one or more keywords and that requests links to media content items related to the keyword(s) is received. In one implementation, the request is a web service invocation transmitted by the embedded software component via the hypertext transfer protocol (HTTP) to media content item manager 145.

At block 602, a new set of one or more keywords is generated based on the keyword(s) received at block 601. In one implementation, media content item manager 145 may consult a dictionary of standard keywords (not depicted in the Figures) and "translate" the keyword(s) received at block 601, as necessary, in accordance with the dictionary. In addition, media content item manager 145 may also delete redundant keywords and include one or more additional related keywords to the new keyword set.

At block 603, a query specifying the new set of keywords and requesting links to media content items relevant to the keywords is submitted. In one implementation, the query is transmitted by media content item manager 145 to media content item store 110.

At block 604, links to relevant media content items are received in response to the query of block 603. In one implementation, media content item store 110 selects the relevant content items based on the new set of keyword(s), and returns the links to media content item manager 145. In some implementations, the links may be ranked when returned by media content item store 110, while in some other implementations, the links may be returned as an unordered set. In implementations where links are ranked, the ranking may be based on one or more criteria such as: a relevancy score for the keyword with respect to the media content item, the current location of the client machine submitting the request, the author of the media content item, and so forth.

At block 605, the links to the selected content items are transmitted to the sender of the request of block 601. In one implementation, media content item manager 145 returns the links to embedded software component via one or more HTTP messages. In some implementations, media content item manager 145 may process the links before returning them to the embedded software component (e.g., limiting the number of links to a maximum, ranking or re-ranking the links according to various other criteria, etc.).

Figure 7:
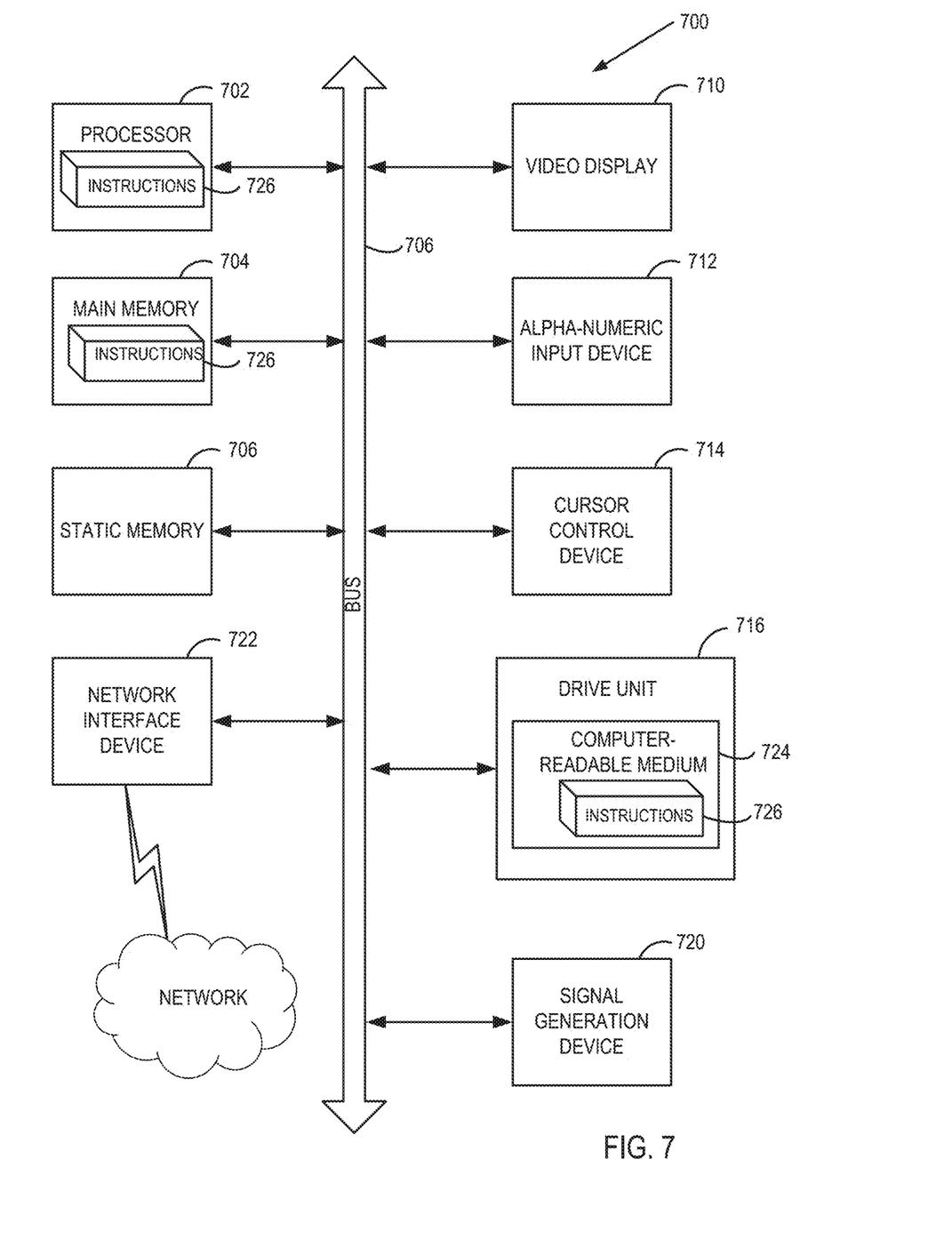
FIG. 7 depicts a block diagram of an illustrative computer system operating in accordance with aspects and implementations of the present disclosure.

FIG. 7 illustrates an exemplary computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable medium 724 on which is stored one or more sets of instructions 726 (e.g., instructions executed by web page manager 225, etc.) embodying any one or more of the methodologies or functions described herein. Instructions 726 may also reside, completely or at least partially, within the main memory 704 and/or within the processor 702 during execution thereof by the computer system 700, the main memory 704 and the processor 702 also constituting computer-readable media. Instructions 726 may further be transmitted or received over a network via the network interface device 722.

While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "providing," "including," "populating," "transmitting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
   transmitting, from a first computer system of a first content platform to a second computer system of a second content platform, a request for a predefined application component that links to videos hosted by the second content platform;
   receiving, at the first computer system of the first content platform, the predefined application component from the second computer system of the second content platform;
   embedding the predefined application component in a user interface of a software application presenting content associated with the first content platform;
   causing the user interface to be provided for presentation on a user mobile device, wherein the predefined application component in the user interface causes the user mobile device to present, in the user interface, the content associated with the first content platform and a playlist, the playlist representing an ordered set of videos to be played sequentially, the ordered set of videos comprising a first video and a second video that are selected from a plurality of videos and ranked based on a relevancy score of the first video and the second video with respect to the content associated with the first content platform; and
   wherein in response to a user selecting a representation of the first video in the playlist, a playback of the first video is provided in the user interface, together with a presentation of the content associated with the first content platform.

2. The method of claim 1, wherein the content associated with the first content platform and the playback of the first video are provided together in the user interface without the user visiting another user interface.

3. The method of claim 1, wherein an execution of the predefined application component by the user mobile device causes one or more keywords to be obtained based on the content associated with the first content platform and a request that specifies at least one of the one or more keywords to be transmitted to the second computing system of the second content platform.

4. The method of claim 3, wherein the request is for one or more videos to be selected based on the at least one of the one or more keywords.

5. The method of claim 1, wherein the content for the first content platform is provided together with the playback of the first video in a playback area of the user interface and a presentation of the playlist in a playlist area of the user interface.

6. The method of claim 1, wherein the first video and the second video are ranked by the second computer system based on one or more criteria including at least one of relevancy scores of the first video and the second video, a current location of the user mobile device, or authors of the first video and the second video.

7. The method of claim 1, wherein the first video and the second video reside in a data store of the second content platform.

8. A first computer system associated with a first content platform, the first computer system comprising:
a memory; and
a processing device, operatively coupled to the memory, to:
transmit, from the first computer system of the first content platform to a second computer system of a second content platform, a request for a predefined application component that links to videos hosted by the second content platform;
receive the predefined application component from the second computer system associated with the second content platform;
embed the predefined application component in a user interface of a software application presenting content associated with the first content platform;
cause the user interface to be provided for presentation on a user mobile device, wherein the predefined application component in the user interface causes the user mobile device to present, in the user interface, the content associated with the first content platform and a playlist, the playlist representing an ordered set of videos to be played sequentially, the ordered set of videos comprising a first video and a second video that are selected from a plurality of videos and ranked based on a relevancy score of the first video and the second video with respect to the content associated with the first content platform; and
wherein in response to a user selecting a representation of the first video in the playlist, a playback of the first video is provided in the user interface, together with a presentation of the content associated with the first content platform.

9. The computer system of claim 8, wherein the content associated with the first content platform and the playback of the first video are provided together in the user interface without the user visiting leaving the user interface.

10. The computer system of claim 8, wherein an execution of the predefined application component by the user mobile device causes one or more keywords to be obtained based on the content associated with the first content platform and a request that specifies at least one of the one or more keywords to be transmitted to the second computing system of the second content platform.

11. The computer system of claim 10, wherein the request is for one or more videos to be selected based on the at least one of the one or more keywords.

12. The computer system of claim 8, wherein the first video and the second video are ranked by the second computer system based on one or more criteria including at least one of relevancy scores of the first video and the second video, a current location of the user mobile device, or authors of the first video and the second video.

13. The computer system of claim 8, wherein the content associated with the first content platform is provided together with the playback of the first video in a playback area of the user interface and a presentation of the playlist in a playlist area of the user interface.

14. A non-transitory, computer-readable medium having instructions stored thereon, the instructions, when executed, cause a processing device of a first computer system associated with a first content platform to:
transmit, from a first computer system of a first content platform to a second computer system of a second content platform, a request for a predefined application component that links to videos hosted by the second content platform;
receive the predefined application component from the second computer system associated with the second content platform;
embed the predefined application component in a user interface of a software application presenting content associated with the first content platform;
cause the user interface to be provided for presentation on a user mobile device, wherein the predefined application component in the user interface causes the user mobile device to present, in the user interface, the content associated with the first content platform and a playlist, the playlist representing an ordered set of videos to be played sequentially, the ordered set of videos comprising a first video and a second video that are selected from a plurality of videos and ranked based on a relevancy score of the first video and the second video with respect to the content associated with the first content platform; and
wherein in response to a user selecting a representation of the first video in the playlist, a playback of the first video is provided in the user interface, together with a presentation of the content associated with the first content platform.

15. The computer-readable medium of claim 14, wherein the first video and the second video are ranked by the second computer system based on one or more criteria including at least one of relevancy scores of the first video and the second video, a current location of the user mobile device, or authors of the first video and the second video.

16. The computer-readable medium of claim 14, wherein an execution of the predefined application component by the user mobile device causes one or more keywords to be obtained based on the content associated with the first content platform and a request that specifies at least one of the one or more keywords to be transmitted to the second computing system of the second content platform.

17. The computer-readable medium of claim 16, wherein the request is for one or more videos to be selected based on the at least one of the one or more keywords.

18. The computer-readable medium of claim 14, wherein the content associated with the first content platform and the playback of the first video are presented in the user interface without the user leaving the user interface.

19. The computer-readable medium of claim 14, wherein the content associated with the first content platform is provided together with the playback of the first video in a playback area of the user interface and a presentation of the playlist in a playlist area of the user interface.

20. The computer-readable medium of claim 14, wherein the first video and the second video reside in a data store of the second content platform.

* * * * *